United States Patent Office 2,939,767
Patented June 7, 1960

2,939,767

MANUFACTURE OF IRON OXIDES

John Martin, Hamilton Square, N.J., assignor to Columbian Carbon Company, New York, N.Y., a corporation of Delaware No Drawing. Filed Oct. 7, 1957, Ser. No. 688,389

10 Claims. (Cl. 23—200)

This invention relates to the production of precipitated iron oxides and, more particularly, to improvements in the method of producing such oxides whereby ferric oxide is precipitated from an aqueous ferrous salt solution by blowing the solution with air or other oxidizing gas. The invention is of particular utility in the producing of pigmentary alpha ferric oxide hydrate.

Alpha ferric oxide hydate, i.e., alpha FeOOH, sometimes written $\alpha Fe_2O_3 \cdot H_2O$, is the familiar yellow oxide of iron, composed of acicular particles of goethite crystalline structure, a well-known article of commerce used mostly as pigment, but also used as a raw material for the production of various ferrite electronic components, magnetic recording materials, magnets and glass polishing materials. Its use as pigment also has been extended to many new materials, involving hundreds of formulations of resins, plastics, rubbers, emulsions, cosmetics, and the like.

The manufacture of a material which will meet the requirements of these many uses demands a process of great versatility, and one which permits precise control and reproducibility of the physical and chemical properties of the final product.

Some of these uses require material of greater purity than that heretofore available. Some require better control of the particle-size distribution, oil absorption, and other properties. Also, of course, there is an ever-present demand for a brighter, cleaner yellow color and greater tinting strength.

My present invention meets these demands by providing a simple and direct process requiring only simple equipment and a minimum of labor and attention. My new process is more economical to operate than previously known processes and requires a smaller capital investment in equipment. It is capable of better control and reproducibility of the product and of producing material having improved color characteristics and greater chemical purity.

So that my present invention may be better understood, I shall first briefly describe previously known methods for producing $\alpha$FeOOH.

(1) $\alpha$FeOOH is formed in aqueous solutions of ferric sulfate or chloride by hydrolysis, according to the following equation:

(1) $Fe^{+++} + 2H_2O \rightleftharpoons \alpha FeOOH + 3H^+$

As is characteristic of such hydrolysis, this reaction is favored by heat and dilution. But since the reaction is reversible, it soon reaches equilibrium and after producing only a few milligrams of $\alpha$FeOOH per liter the reaction ceases.

It is apparent from the above equation that if an alkali be added to neutralize the hydrogen ions, as they are formed, the reaction would continue on to completion. However since, ferric salts are not readily available and are relatively expensive and since, as shown by the equation, three equivalents of alkali are required for each mole of $\alpha$FeOOH formed, the cost of this process is presently prohibitive. As a result very little work has been done to develop this method.

(2) $\alpha$FeOOH is also formed in solutions of ferrous sulfate or chloride upon exposure to air or oxygen. In this case, ferrous ions are oxidized to ferric ions which then hydrolize to produce $\alpha$FeOOH and free acid. This reaction is believed to take place in two steps as follows:

(2)  $2Fe^{++} + \frac{1}{2}O_2 + H_2O \rightarrow 2Fe(OH)^{++}$
(3).  $Fe(OH)^{++} + H_2O \rightleftharpoons \alpha FeOOH + 2H^+$ Net reaction:

(4)  $2Fe^{++} + \frac{1}{2}O_2 + 3H_2O \rightleftharpoons 2\alpha FeOOH + 4H^+$ Whether or not these equations represent the actual mechanism of the reaction, the quantitative balance between the starting materials and the final products of the reaction is accurately represented. It is important to note that only two equivalents of acid are produced per mole of $\alpha$FeOOH, instead of three equivalents of acid as in the case of ferric salt solutions of Method 1.

The first step in this process, oxidation, can be accelerated by blowing a free oxygen containing gas, e.g. air, through the solutions. The second step, hydrolysis, is accelerated by heat and dilution. But here also it is noted that the second step is reversible and when sufficient acid has formed to lower the pH to about 2.0 the reaction ceases, producing only a very small quantity of $\alpha$FeOOH.

If means are provided to neutralize the acid as it is formed, the reaction will continue. However, since the product of this reaction, carried out as described above, is formed rather slowly with very few nuclei present, the $\alpha$FeOOH soon becomes rather coarse and of poor quality for most purposes.

(3) $\alpha$FeOOH may be prepared by the addition of an alkali hydroxide or carbonate solution to an excess of ferrous salt solution and oxidizing the ferrous precipitate by blowing with air at a moderately low temperature (65–125° F.). The $\alpha$FeOOH produced by this method is formed rapidly, with a great number of nuclei present and is therefore of very small particle-size. It is gelatinous, difficult to process and of very limited usefulness, except as a seed slurry as hereinafter described.

(4) The fourth method to be noted is that of Penniman and Zoph. This is essentially a combination of Methods 2 and 3 with the feature of using iron metal to neutralize the acid formed by the hydrolysis step mentioned in Method 2. The Penniman-Zoph process has been by far the most successful, has been extensively used commercially and will therefore be discussed in some detail.

First of all, a seed slurry of finely-divided $\alpha$FeOOH is made by Method 3 above. Then the resulting suspension or slurry of colloidal $\alpha$FeOOH in dilute ferrous salt solution is pumped into a specially constructed tank provided with a rack containing a quantity of iron metal scrap. The temperature of the slurry is raised to 140–180° F. and a current of air is passed through the mass.

The equations given under Method 2 represent the reaction, with the addition that the free acid formed attacks the iron metal and is thus neutralized, at the same time replenishing the ferrous ions in solution. The net reaction is as follows:

(5) $2Fe^{++} + \frac{1}{2}O_2 + 3H_2O + 2Fe \rightarrow 2\alpha FeOOH + 2Fe^{++}$ The rate of reaction is controlled by the volume and effectiveness of the oxidizing air, the exposed surface-area of the iron metal, the concentration of ferrous salt and the temperature and is ordinarily maintained such that the pH is within the range 2.5–3.5. Under these conditions there is no precipitation of ferrous iron, and the ferric iron which is precipitated is deposited on the existing seed of αFeOOH. The rate of production usually ranges from 3-6 pounds of αFeOOH per thousand gallons of ferrous salt solution per hour.

The particle-size increases and the color becomes darker as the reaction progresses. The range of desired material usually occurs when the original seed weight has been increased from 10-100 fold. This will usually require from 5-50 days, giving a range of color from very light lemon yellow to a very dark orange.

The greatest disadvantage of this process is attributable to the use of the iron metal scrap. The special tanks required to hold the iron metal are expensive, difficult to construct and require a great deal of maintenance. Also a great deal of labor is required in handling the iron metal in the plant. The metal used (it must be scrap metal to make the process economically practical) is extremely variable in purity and in its physical size, shape and cleanliness.

The carbon, which all iron contains, dirties the color. Copper from the iron causes the product to behave poorly in rubber. Arsenic from the iron metal prohibits the use of the product in cosmetics and other materials where rigid specifications as to purity must be met. Also it is difficult to remove fine particles of metal from the product.

The surface area of the iron metal is one of the principal controlling factors of the rate of reaction but, since it is virtually impossible to have the same surface area of iron available from day to day, the rate of reaction is subject to unpredictable variations. This requires a great deal of laboratory testing and extrapolation of results to determine when the reaction should be stopped.

Also, the presence of the scrap iron in the process tank tends to impede the flow of air through the reaction mass. In many cases pockets form which get insufficient air, resulting in the formation of an incompletely oxidized ferroso-ferric material which gives the product a dirty-greenish color.

(5) As mentioned above, an alkali solution may be use in place of the iron metal for neutralizing the acid formed by Formula 4, thus promoting the precipitation of the αFeOOH. In this process a seed slurry of αFeOOH is made as in Method 3, but, since no iron metal is available to replace the precipitated iron, all the iron converted to αFeOOH must come from this solution, therefore a strong solution of ferrous salt is used.

The slurry of αFeOOH seed is heated and aerated while a solution of alkali hydroxide or alkali carbonate is pumped into the reaction tank at a rate sufficient to maintain the pH within the range of 2.5-5.0.

A primary disadvantage of this process is the high pH which exists where the alkali solution first encounters the reaction mass. This causes the precipitation of ferrous material which reacts with the αFeOOH seed to form a ferrosoferric compound which is very detrimental to the color of the product. Also, new seed material is continuously formed under these conditions. This greatly retards the aging process, i.e. crystal growth.

This condition is improved by the use of more dilute alkali solutions. But when one resorts to that expedient, the increase in volume of the reaction mass is so rapid that only a small amount of product can be produced in a unit volume of slurry.

In accordance with my present process, the above noted difficulties experienced with the previously known methods are entirely avoided, or at least minimized. I entirely avoid the use of the troublesome scrap iron of Method 4 and likewise avoid the troublesome step of adding the alkali solutions of Method 5. This is made possible, in accordance with my present invention, through the use of anhydrous ammonia to maintain the hydrogen ion concentration of the ferrous salt solution within the required operating range.

The ammonia is introduced into the ferrous salt solution as gaseous ammonia dispersed in the aerating air or other free oxygen-containing gas. By this means the ammonia is diluted by the air before coming into contact with the salt solution and is rapidly, uniformly dispersed throughout the solution.

Where the air and ammonia are premixed, the air-ammonia mixture serves as both the oxidizing and precipitating agent.

This mixture may, for instance, be introduced into the bottom of the reaction tank through a circular perforated manifold. The ammonia is thus uniformly distributed throughout the reaction mass in a dilute, finely-divided and active condition. As long as the pH of the mass is kept below 6.5-7.0, I have experienced no loss of ammonia whatever.

The net reaction involved is as follows:

$$2Fe^{++} + \frac{1}{2}O_2 + 4NH_3 + 3H_2O \rightarrow 2\alpha FeOOH + 4NH_4^+$$

The concentration of ammonia in the air stream is adjusted to maintain the pH of the reaction within the range 2.0-6.0, preferably 3-4. The percent ammonia by weight in the air stream may vary from 0.5-10.0% $NH_3$ or even 25%, depending upon efficiency of utilization of the oxygen, frequently more advantageously about 4%.

The precise and uniform control of pH is one of the advantages of my process. Since some of the physical characteristics of the product depend upon the pH at which it is formed, the pH may be varied according to the desired end-product. For instance, if the pH is kept low say from 2.0-2.5 there is a tendency for the acidity to dissolve some of the smaller particles of αFeOOH, thereby a different particle-size distribution is obtained than if the pH be maintained at 3.0-3.5.

To maintain a given pH, the concentration of ammonia, as previously noted, depends upon the efficiency of the oxidation; αFeOOH can be precipitated only as fast as it is oxidized. This then depends upon how the air is introduced, the concentration of the ferrous salt solution, and the thickness of viscosity of the slurry. This last affects the efficiency of aeration. These conditions are therefore largely interdependent but are subject to substantial variation, as will be understood by those familiar with this art.

According to one aspect of my invention, I use αFeOOH seed slurry suspended in a relatively concentrated solution of ferrous salt e.g. 10-20% $FeSO_4$. Since oxidation is rapid in this solution, a relatively high concentration of ammonia may be used in the beginning of the operation but as the reaction progresses the solution becomes constantly weaker, oxidation becomes slower and the concentration of ammonia should be reduced accordingly.

In another variation I use a seed slurry suspended in a relatively dilute solution of ferrous salt, e.g. 1-4% $FeSO_4$. In this case, as the reaction progresses, a strong solution of the ferrous salt is continuously pumped into the reaction tank at a rate such as to maintain the ferrous salt concentration substantially constant. The ammonia concentration in the air may then be held constant also, until the solids in the slurry reach 7-8%. The slurry then begins to thicken, the oxidation efficiency drops off and the ammonia concentration in the air stream should be reduced.

The amount of seed, αFeOOH, present at the start of the process is one of the important controls. The more seed crystals used, the longer it takes to reach a given shade of yellow, and the greater the weight of product one has when the desired shade is reached. Therefore it is usually advantageous to use a fairly large amount of seed crystals for light shades of yellow and correspondingly less for deeper shades.

Under these conditions, the production of αFeOOH ranges from 10–40 pounds per thousand gallons of ferrous salt solution per hour, with an average of about 25 pounds/1000 gallons/hour. This is at least five times the average production rate obtained using the scrap iron process. Thus a batch requiring 10 days by the scrap iron process is produced in 2 days by my ammonia process. Also a single tank using my ammonia process will produce as much product as 5 tanks operated on scrap iron.

The ammonia used is with advantage a regular commercial grade of anhydrous liquid ammonia of 99.9% purity. The equipment for handling the ammonia may consist of a storage tank, a steam-jacketed vaporizer, a flow meter and a regulator valve. On opening the valve on the storage tank the ammonia flows, under its own pressure, into the vaporizer where it is converted into gaseous ammonia. The gaseous ammonia is now fed into the air stream going into the process tank, the flow being controlled by the regulator valve.

In accordance with a broader aspect of the invention, I may prepare a slurry of the seed crystals of alpha FeOOH by any known method and grow the seed to the desired size by precipitating further alpha FeOOH thereon, as herein described. Advantageously the seed is formed as a preliminary step of my process and preferably in the ferrous salt solution and tank to be used in the subsequent step of the operation. However, the invention is not restricted in that respect nor to the particular method by which the seed slurry is produced. The seed slurry, for instance, may be produced by rapid precipitation from a ferrous salt solution by adding ammonia thereto while aerating, in accordance with my present invention, or by neutralizing the ferrous salt solution with sodium hydroxide, sodium carbonate or the like.

The invention will be illustrated by the following examples:

*Example I*

7,500 gallons of 12% ferrous sulfate solution is placed in a reaction tank, of the type previously described, at a temperature of 70–80° F. Air is turned on at about 75 cubic feet per minute and the valves in the ammonia system are fully opened. 200 pounds of ammonia is passed into the ferrous sulfate solution, in admixture with the air, as rapidly as possible (15–20 minutes). The ammonia is then shut off, but the aeration is continued unitl the ferrous hydroxide precipitate is completely oxidized to αFeOOH. At the point where the ammonia is shut off the pH will usually be about 6.9–7.1, but as the oxidation proceeds the pH drops, eventually dropping to about 2.7–3.0 when the oxidation is complete. By this procedure, the seed crystals of αFeOOH are formed. This usually requires 5–6 hours.

After the precipitate has become a clear yellow color and the pH has dropped to below 3.0, steam is admitted to the tank and the slurry is heated to 160–180° F. The flow of air is increased to 150–200 c.f.m. and the ammonia valve is opened to admit ammonia to the air stream at a rate of 1.25–1.5 pounds per minute. This will keep the pH in the range of 3.0–3.5. As the reaction progresses, and the ferrous sulfate solution becomes weaker, the ammonia feed-rate is reduced, ending up at about .75 pound per minute.

When about 1500 pounds of ammonia has been introduced, the ferrous sulfate will be almost completely oxidized and precipitated as a αFeOOH. The color of the product will be what is known in the industry as a light lemon yellow and the yield will be about 4650 pounds of αFeOOH. The total running time is about 30 hours including the time required to make the seed crystals.

The slurry is now filtered, washed and dried at about 235° F.

*Example II*

5000 gallons of a 3% ferrous sulfate solution is placed in the reaction tank at a temperature of 75–85° F. Air is admitted at 75–100 c.f.m. A total of 150 pounds of ammonia is added at a rate of 12.5–15 pounds per minute. The ammonia is then shut off, but the aeration is continued until the ferrous precipitate is completely oxidized, thus forming the αFeOOH seed crystals.

When the oxidation is completed, steam is admitted to raise the temperature of the suspension to 160–180° F. The air flow is increased to 170–225 c.f.m. and the ammonia valve is opened to admit ammonia to the air stream at a rate of about one pound per minute. At the same time, a strong (30%) solution of ferrous sulfate is pumped into the reaction tank continuously, at a rate of about 1.5–2.0 gallons per minute. Under these conditions, the pH is maintained in the range 3.5–4.0, and the ferrous sulfate concentration is maintained at about 3%. The operation is continued until about 1800 pounds of ammonia and 3000 gallons of 30% ferrous sulfate solution has been introduced.

The above batch will yield approximately 5000 pounds of αFeOOH. Running time is about 36 hours. The slurry is filtered, washed and dried at 235° F. and the product is a clean, bright lemon yellow.

If a darker shade of yellow is desired, it is necessary to use less seed to start with. In the case of a very dark shade we may use as little as 25 pounds of ammonia to form the initial seed material.

*Example III*

5000 gallons of a 4% ferrous sulfate solution is placed in the reaction tank at 85° F. Air is admitted at 75 c.f.m. and 600 pounds of 50% sodium hydroxide solution is pumped into the ferrous sulfate solution in 5–10 minutes. Aeration is continued until the ferrous precipitate is completely oxidized requiring 5–6 hours.

When oxidation is complete the remainder of the run is carried out as in Example II. The final color and the yield are also the same as in Example II.

*Example IV*

7500 gallons of 18% ferrous sulfate solution is placed in the reaction tank at a temperature of 70–80° F. Air is passed into the tank at about 75 c.f.m. and the ammonia valves are fully opened. One hundred pounds of ammonia is passed into the air stream as rapidly as possible (8–10 minutes). The ammonia is then shut off but aeration is continued until the ferrous precipitate is completely oxidized to αFeOOH. This usually takes 3–4 hours.

Steam is now admitted to the tank and the slurry is heated to 170–190° F. The air flow is increased to 150–200 c.f.m. and the ammonia valve is set to admit 1.5–1.8 pounds ammonia per minute to the air stream. The pH will be in the range of 2.7–3.0. Because of the smaller amount of seed used in this example the reaction proceeds more rapidly due to the lower viscosity. Toward the end of the run the ammonia feed may have to be reduced to about 1.0 pound per minute.

When about 2250 pounds of ammonia has been passed into the slurry the ferrous sulfate will be almost completely precipitated as αFeOOH.

The product is medium dark orange in color, the yield is about 7000 pounds and the running time is approximately 27 hours including the time required to prepare the seed. The production rate is 35 pounds per hour per 1000 gallons.

The product is now filtered, washed and dried at 235° F.

It should be mentioned that ferrous chloride may be used instead of the ferrous sulfate of the above examples and also other alkali hydroxides or carbonates may be used in preparing the seed material.

The product obtained from the above examples is cleaner and brighter in masstone and stronger and yellower in tint than corresponding material prepared by the iron metal process.

Where the seed is formed by my ammonia process, the temperature of the ferrous salt solution should be within the range of 65° to 125° F. during the seed-forming step, usually more advantageously within the range 70°–90° F. During my aging step, the temperature should be maintained within the range 125°–200° F. However, I have generally obtained superior results at temperatures of 150°–190° F.

The impurities present in my oxides will depend substantially solely upon the purity of the ferrous salt solution used, particularly when the seed slurry is also precipitated by the use of ammonia. Impurities from that source can, in a large measure, be controlled and minimized. However, by the conventional scrap iron process the impurity introduced into the product by the scrap iron is largely beyond the control of the operator.

Typical analysis of the product of my present ammonia process and of products characteristic of the conventional scrap iron process, each using copperas as the ferrous salt solution, are set forth in the following tabulation. All percentages are by weight.

|  | Ammonia Process | Scrap Iron Process |
|---|---|---|
| Percent $Fe_2O_3$ | 88.10 | 87.50 |
| Percent Ignition Loss | 11.70 | 11.70 |
| Percent Acid Insoluble | 0.002 | [1] 0.15 |
| Percent Water Soluble | 0.05 | 0.05 |
| Percent C | None | 0.10 |
| Percent Cu | 0.003 | 0.050 |
| Percent Mn | 0.020 | 0.020 |
| Percent $SO_3$ | 0.70 | 0.95 |
| Percent S (sulfide) | None | 0.015 |
| Percent As | 0.0003 | 0.0015 |
| Percent Pb | 0.0005 | 0.0010 |

[1] Largely silica from the scrap iron.

I claim:

1. In the process for precipitating pigmentary alpha ferric oxide hydrate from aqueous ferrous salt solution whereby a free oxygen-containing gas is passed in intimate contact with the salt solution, ferric oxide is formed and hydrolyzed with evolution of hydrogen ions and the hydrogen ions are neutralized to maintain the pH of the solution within the range of 2.5 to 5, the step of maintaining the hydrogen ion concentration within said range by introducing into the aqueous salt solution anhydrous ammonia premixed with the free oxygen-containing gas, while maintaining the temperature of the solution within the range of 125° to 200° F., the concentration of the anhydrous ammonia in the gas mixture being within the range extending from about 0.5% to about 25% by weight.

2. The process of claim 1 in which there is contained in the aqueous ferrous salt solution a slurry of alpha ferric oxide hydrate seed crystals.

3. The process for producing pigmentary alpha ferric oxide hydrate which comprises rapidly introducing gaseous ammonia, premixed with a free oxygen-containing gas, into an aqueous ferrous salt solution at a temperature within the range of 65° to 125° F. until the pH of the solution has increased to above 7, discontinuing the introduction of ammonia while continuing the introduction of the free oxygen-containing gas until the pH of the solution has dropped to about 3, then raising the temperature of the solution to within the range of 125° to 200° F. and resuming the introduction of ammonia in admixture with the free oxygen-containing gas at a concentration within the range extending from about 0.5% to about 25% by weight of the gas mixture and at a rate such as to maintain the pH of the solution within the range of about 2.5 to about 5 until the ferrous salt of the solution has been substantially completely oxidized and precipitated as alpha FeOOH.

4. The process of claim 1 in which the ferrous salt is ferrous sulfate.

5. The process of claim 1 in which the aerating gas is air having dispersed therein from 0.5% to 10% by weight of gaseous $NH_3$.

6. The process of claim 1 in which the ammonia is introduced into the salt solution dispersed in air and at a rate such as to maintain the pH of the solution within the range of about 3 to about 4.

7. The process of claim 1 in which the ferrous salt is ferrous sulfate and the initial concentration of the solution is within the range of 1–20 weight percent.

8. The process of claim 3 in which the ferrous salt is ferrous sulfate and the initial concentration of the ferrous sulfate solution is within the range of 10% to 20%.

9. The process of claim 3 in which the ferrous salt is ferrous sulfate, the initial concentration of the ferrous sulfate solution is within the range of 1% to 4% and ferrous sulfate is added to the solution during the second stage of the operation at a rate such as to maintain the ferrous sulfate concentration substantially constant.

10. The process of claim 5 in which the concentration of the anhydrous ammonia in the gas stream is about 4% by weight.

References Cited in the file of this patent

UNITED STATES PATENTS

| 1,994,702 | Harris | Mar. 19, 1935 |
| 2,388,659 | Ryan et al. | Nov. 6, 1945 |
| 2,529,874 | Hoak | Nov. 14, 1950 |
| 2,560,970 | Martin | July 17, 1951 |
| 2,605,169 | Tiddy et al. | July 29, 1952 |

FOREIGN PATENTS

| 23,858 | Great Britain | 1900 |